Feb. 10, 1959 A. B. CAMPBELL Re. 24,599

DISPENSING VALVE STRUCTURE FOR AEROSOL CONTAINER

Original Filed June 30, 1952

Inventor:
Albert B. Campbell,
By Schneider, Merriam,
Hofgren & Brady, Attys.

United States Patent Office

Re. 24,599
Reissued Feb. 10, 1959

24,599

DISPENSING VALVE STRUCTURE FOR AEROSOL CONTAINER

Albert B. Campbell, Du Page County, Ill., assignor to Campbell Products Co., a corporation of Illinois Original No. 2,766,915, dated October 16, 1956, Serial No. 296,359, June 30, 1952. Application for reissue May 19, 1958, Serial No. 736,420

7 Claims. (Cl. 222—394)

Matter enclosed in heavy brackets [ ] appears in the original patent but forms no part of this reissue specification; matter printed in italics indicates the additions made by reissue.

[This invention relates to a valve structure, and more particularly to a dispensing valve structure for an aerosol container.] *This invention relates to combinations which include a dispensing valve assembly and a cap for selectively actuating same.*

The use of aerosol dispensing units is currently becoming more and more prevalent. They are used extensively to dispense whipping cream, shaving lather and similar materials. The aerosol unit consists of a container portion and a dispensing valve mechanism of some type. Containers ranging in size from six fluid ounces to sixteen fluid ounces are generally used and the dispensing valves vary in size and in mode of operation. Basically, the operation consists of unseating a valve by horizontal or vertical pressure which allows the ingredients within the container, activated by the pressure therein, to rush by the [value] *valve* to the outside. A relatively small proportion of the contents of a container is discharged each time it is used, for example, enough whipping cream is dispensed to decorate desserts or sufficient lather is emitted for shaving purposes. When the valve operating pressure is released, the valve reseats itself and once again restricts the escaping contents and pressure within the container. [The present invention pertains only to a valve structure for regulating the flow of ingredients from an aerosol container, and is not concerned with the container or the ingredients therein.]

One of the chief difficulties in using these dispensers is in keeping the valve structure clean after usage. The problem is particularly acute when dairy products, mainly cream, are dispensed. After each use of the dispenser an amount of cream remains exposed to the air between the valve and the delivery nozzle of the dispenser. This cream solidifies when the intervening period between uses is sufficiently prolonged. This is objectionable from a sanitation standpoint, and such excess solidified cream may interfere with the operation of the valve unit. During the next discharge of the container, this excess cream will be emitted and it renders the whipping cream less appetizing. Furthermore, it is a well-known fact that bacteria thrive in an exposed ingredient such as cream.

The importance of the health problem created by this residue of cream is obvious. None of the dispensers currently used has a method for cleaning out the spouts and nozzles after operation. The present invention provides an economical, durable and dependable valve structure which may be maintained in a sanitary condition at all times. This invention has a spout cap which can be removed after the container has been used to expose the excess material remaining within the valve housing and around the emitting orifice. This material can easily be washed off in running water while the tightly sealed valve prevents entry of the water into the contents of the dispenser. The container may then be put away for use at a later time in the same neat and clean condition as when it was purchased.

This invention will be described as related to the accompanying drawings, in which:

Fig. 4 is a vertical sectional view similar to Fig. 3, showing a valve structure as used for dairy products and the like.

Figure 1:
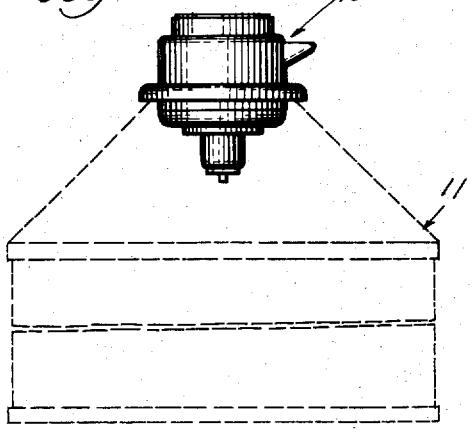
Fig. 1 is a side elevational view of applicant's invention assembled on an aerosol container shown in dotted outline.
Figure 2:
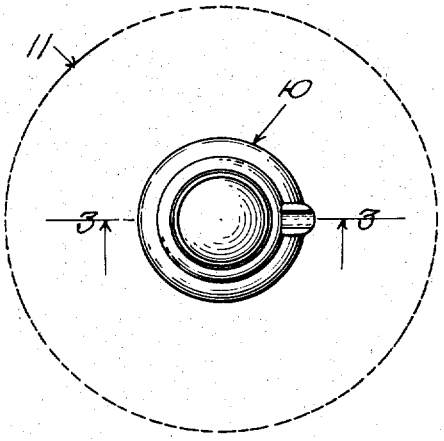
Fig. 2 is a plan view of the invention shown in Fig. 1.

Referring to Figs. 1 and 2 of the drawings, the valve structure, generally designated 10, is seated upon an aerosol container, generally designated 11. The container is a steel can of usual manufacture often used as a container for beverages. Ordinarily an aerosol packager can purchase the cans from a commercial source. The cans are filled with the ingredient to be dispensed prior to sealing the valve structure in the neck of the can. After filling, the valve structure may be sealed to the can in order to close the interior from the exterior of the can, except through the valve. A gas is then forced through the valve to charge the container and its contents.

Figure 3:
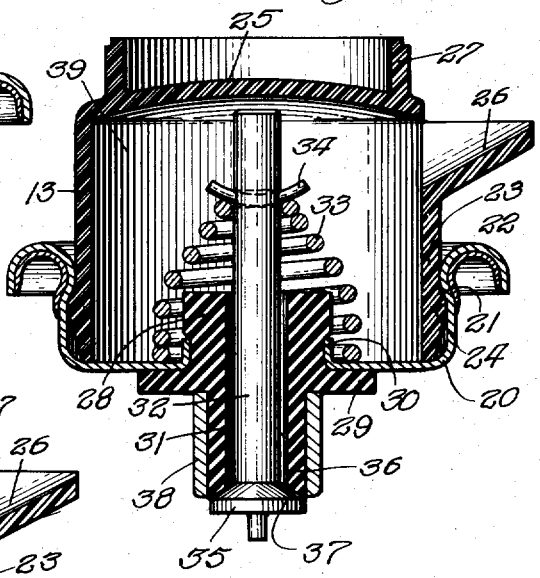
Fig. 3 is a sectional view centrally through the valve structure showing one particular form of the invention.
Figure 4:
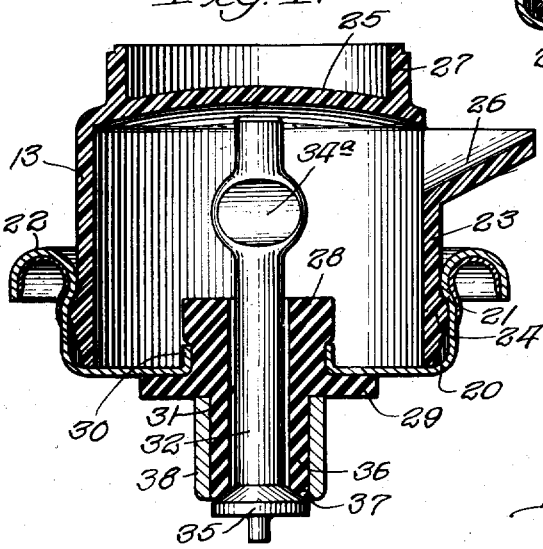

The details of connection between the can and the valve structure may best be seen in enlarged view, Figs. 3 and 4. Substantially all of the valve structure is supported on a base herein referred to as a valve housing. This base is securely sealed to the container. In Figs. 3 and 4 the present invention is disclosed having a cup-shaped valve housing 20 and a beaded rim 21. The outermost surface of the rim 22 is curved so that it may be attached and sealed to the top of container 11. The housing 20 serves as a recess for a plastic spout cap, generally designated 13, and more particularly as a recess for the skirt portion 23 of the spout cap. The lower part of the skirt portion has an annular peripheral holding rib 24. In seating the spout cap within the valve housing this rib 24 passes by the beaded rim 21 of the valve housing and nestles below it. The engagement between the rib of the skirt portion 23 and the rim 21 of the valve housing keeps the spout cap and the valve housing securely together. Since the spout cap is composed of a resilient material, such as plastic, a slight upward pressure on one side of the spout cap will allow the rib 24 to pass upwardly by the beaded rim 21, and the spout cap may be removed. The spout cap is further made up of a top closure 25 which, when depressed, discharges the contents of the aerosol container through spout 26. An integral protective rim 27 surrounds the top closure to prevent accidental discharge of the aerosol container by bumping the top of the spout cap. This feature allows the container to be packed in a suitcase with clothes and the like with no fear that it may be accidentally discharged.

As previously stated, the valve structure is mounted in and supported by the base portion or valve housing 20. A sleeve member 28, made of rubber or some similar resilient material, is secured in a bottom opening in the cup-shaped housing 20. This sleeve member has an outwardly extending flange portion 29 which acts as a seal between the housing and the sleeve to prevent the escape of pressure from within the container. A small, round, upturned portion 30 around the bottom opening in the housing is embedded in a circular indentation in the sleeve member lying just above the flange portion 29. This tight fit between the housing and the sleeve member plus the upward pressure from within the container urging the flange portion against the inside of the housing provide a perfect seal about the bottom opening in the housing. The sleeve has a central bore 31 through which a valve stem 32 passes.

Fig. 3 discloses one form which the present invention may take. It shows a helically-shaped spring 33 which surrounds the upper portion of the sleeve and bears against a spring bearing member 34 upon the valve stem. This spring aids in keeping the valve stem 32 in a centered position in addition to urging the valve head 35 toward its seated position.

Fig. 4 shows another form of the present invention. Here there is no spring. There is simply a valve stem having an upper flattened portion 34*a* which retains the valve within the sleeve while the container is being filled with gas. This embodiment is particularly useful where dairy products are to be dispensed. The absence of a spring makes it even easier to clean after the spout cap is removed. In Fig. 4 the valve head 35 is retained in closed position solely by valve seating pressure from within the container acting on the face of the valve head 35.

The lower portion 36 of the sleeve is cut to provide a seat 37 for the valve head 35. A metal collar 38 surrounds the lower portion 36 so that the valve seat 37 will be maintained in shape and thus provide a good seat for the valve head.

In operation, the thumb or forefinger depresses top closure 25 against the top of valve stem 32 thus unseating valve head 35. The pressure within the aerosol container forces the contents through passageway 31 into the chamber 39 formed by the spout cap 13 and the valve housing 20. From this chamber it passes out spout 26 for use as desired. It is readily apparent that a considerable quantity of ingredients remains within chamber 39 after usage. The necessity for its removal is likewise apparent. If the ingredient were soap, it would harden on exposure to air. Clogging of the feed passage 31 would render the aerosol container inoperable. If the ingredient were cream, the problem of cleanliness and clogging would both arise. Applicant's valve structure eliminates both of these problems. Immediately after use the spout cap 13 may be removed by a slight upward pressure. Then this cap and the top of the aerosol container around the valve stem can be thoroughly cleansed. When the aerosol container is put away pending later use, it is in the same clean condition as when it was new.

Figure 5:
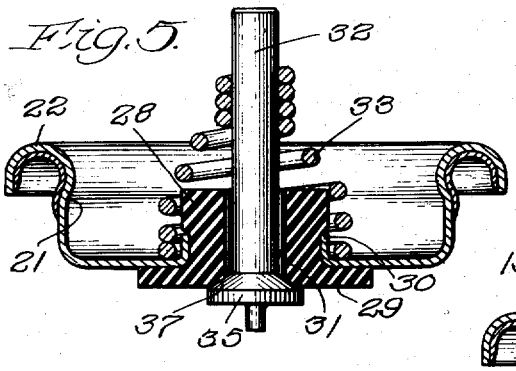
Fig. 5 is a vertical sectional view through the base of a modified form of the valve.

The valve structure of Fig. 5 differs from the structure of Fig. 3 in that the sleeve 28 does not have the depending lower portion. The valve seat 37 is formed adjacent the surrounding flange 29. Plastic material is used in forming the valve stem 32 and its valve head 35. The spring 33 has coils 40 at the top wound tightly about the valve stem, thus obviating the use of a spring bearing member such as 34 in Fig. 3. The base valve housing 21 is adapted to receive the same spout cap 13 as is shown in the other figures.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. A dispensing valve structure for an aerosol container comprising: a valve housing having an opening, said housing having means for being attached to a container; a resilient sleeve secured against the inner side of said housing permitting selective sealing of said opening in the housing, said sleeve having a bore extending therethrough for guiding and permitting movement of a valve stem therein and a valve seat about said bore on the inner side of said sleeve; a valve member having an elongated stem portion extending through said bore beyond the outer side of the housing, said stem having a valve head at an inner portion thereof capable of being seated against said valve seat, thus permitting selective sealing of said bore; spring means circumscribing an outer end portion of said stem positioned against the outer side of the housing, the outer end of the spring being positioned about an outer end portion of the stem so that movement of the stem into the container unseats the valve from the valve seat and causes compression of the spring, said compressed spring serving to urge the valve into the valve seat; a spout-cap having a skirt portion circumscribing the spring and the outer end portion of the stem, the lower end of said skirt having retaining means for permitting the cap to be selectively secured to and removed from the outer side of the housing, the upper end of the skirt having a flexible top which, when depressed, moves the stem towards the container, depresses the spring, and unseats the valve, thus permitting the contents of the container to enter the bore, the interior of the cap, and to be ejected out through the spout which extends from said cap, said spout-cap permitting access to the valve assembly that extends beyond the outer side of the housing when said cap is removed from the housing to facilitate the cleaning of exposed surfaces.

2. The dispensing valve structure set forth in claim 1 wherein the top of the spout-cap has an upstanding wall extending above said top capable of being depressed independently of the flexible portion, thus preventing accidental depression of the flexible portion which would cause unseating of the valve.

3. In an aerosol dispenser: a dispenser container having an opening for receiving a dispensing valve; and a dispensing valve structure for an aerosol container comprising a valve housing having an opening, said housing being secured to the container at said opening in the container; a resilient sleeve secured against the inner side of said housing permitting selective sealing of said opening in the housing, said sleeve having a bore extending therethrough for guiding and permitting movement of a valve stem therein and a valve seat about said bore on the inner side of said sleeve; a valve member having an elongated stem portion extending through said bore beyond the outer side of the housing, said stem having a valve head at an inner portion thereof capable of being seated against said valve seat, thus permitting selective sealing of said bore; spring means circumscribing an outer end portion of said stem positioned against the outer side of the housing, the outer end of the spring being positioned about an outer end portion of the stem so that movement of the stem into the container unseats the valve from the valve seat and causes compression of the spring, said compressed spring serving to urge the valve into the valve seat; a spout-cap having a skirt portion circumscribing the spring and the outer end portion of the stem, the lower end of said skirt having retaining means for permitting the cap to be selectively secured to and removed from the outer side of the housing, the upper end of the skirt having a flexible top which, when depressed, moves the stem towards the container, depresses the spring, and unseats the valve, thus permitting the contents of the container to enter the bore, the interior of the cap, and to be ejected out through the spout which extends from said cap, said spout-cap permitting access to the valve assembly that extends beyond the outer side of the housing and the housing when said cap is removed from the housing to facilitate the cleaning of exposed surfaces.

4. In an aerosol dispenser: a dispenser container having an opening for receiving a dispensing valve; and a dispensing valve structure for an aerosol container comprising a valve housing having an opening, said housing being secured to the container at said opening in the container; a resilient sleeve secured against the inner side of said housing permitting selective sealing of said opening in the housing, said sleeve having a bore extending therethrough for guiding and permitting movement of a valve stem therein and a valve seat about said bore on the inner side of said sleeve; a valve member having an elongated stem portion extending through said bore beyond the outer side of the housing, said stem having a valve head at an inner portion thereof capable of being seated against said valve seat, thus permitting selective sealing of said bore; spring means circumscribing an outer end portion of said stem positioned against the outer side of the housing, the outer end of the spring being positioned about an outer end portion of the stem so that movement of the stem into the container unseats the valve from the valve seat and causes compression of the spring, said compressed spring serving to urge the valve into the valve seat; a spout-cap having a skirt portion circumscribing the spring and the outer end portion of the stem, the lower end of said skirt having securing means for permitting the cap to be selectively retained to and removed from the outer side of the housing, the upper end of the skirt having a flexible top which, when depressed, moves the stem towards the container, depresses the spring, and unseats the valve, thus permitting the contents of the container to enter the bore, the interior of the cap, and to be ejected out through the spout which extends from said cap, said spout-cap permitting access to the valve assembly that extends beyond the outer side of the housing and the housing when said cap is removed from the housing to facilitate the cleaning exposed surfaces, said top of the spout-cap having an upstanding wall extending above said top capable of being depressed independently of the flexible portion, thus preventing accidental depression of the flexible portion which would cause unseating of the valve.

*5. An aerosol dispenser assembly having a container, valve assembly and cap, which comprises: a dispenser container having an upper opening and valve housing means for receiving a dispensing valve assembly; a dispensing valve assembly sealably secured to said upper opening of the container comprising substantially vertically extending fluid passage means with an upper outlet positioned above said container and a lower inlet communicating with the confines of said container; a vertically extending, vertically reciprocative valve stem having an upper portion extending above said container; and sealing means for selectively opening and sealably closing said fluid passage means; said sealing means, valve stem and passage means being operatively associated with each other so that said sealing means normally closes said passage means and thereby prevents the egress of contents of said container through said passage outlet, and movement of said stem from its normal position permits the egress of contents of said container through said passage outlet; and an integral flexible removable plastic cap comprising a cylindrical noncollapsible skirt portion normally detachably secured to said container and normally circumscribing said passage means and said upper portion of the reciprocative valve stem; the lower end of said skirt having retaining means for permitting the cap to be secured to said upper end of the container; said cap having a fluid outlet projecting from the skirt portion at an angle to the axis of said stem and through which the container contents is adapted to spout; said cap having a substantially flat flexible top spaced above said skirt which, when depressed, moves said valve stem from its normal position towards said container opening thereby permitting the egress of contents of said container through said passage outlet; a substantially vertical upstanding wall extending above said flexible top and said skirt for preventing accidental depression of said flexible top and said valve stem; said flexible top being capable of being depressed independently of said upstanding wall and said skirt but only by selective pressure applied witthin the boundary of the upstanding wall.*

*6. A aerosol dispenser assembly having a container, valve assembly and cap, which comprises: a dispenser container having an upper opening for receiving a dispensing valve assembly; a dispensing valve assembly sealably secured to said upper opening of the container comprising substantially vertically extending fluid passage means with an upper outlet positioned above said container and a lower inlet communicating with the confines of said container; a vertically extending, vertically reciprocative valve stem having an upper portion extending above said container; and sealing means for selectively opening and sealably closing said fluid passage means; said sealing means, valve stem and passage means being operatively associated with each other so that said sealing means normally closes said passage means and thereby prevents the egress of contents of said container through said passage outlet, and movement of said stem from its normal position permits the egress of contents of said container through said passage outlet; and an integral flexible removable plastic cap comprising a cylindrical noncollapsible skirt portion normally detachably secured to said container and normally circumscribing said passage means and said upper portion of the reciprocative valve stem; the lower end of said skirt having retaining means for permitting the cap to be secured to said upper end of the container; said skirt portion having an outwardly projecting fluid outlet extending from the skirt portion at an angle to the axis of said stem and through which the container contents is adapted to spout; said cap having a substantially flat flexible top spaced above said skirt and overlying said upper portion of the valve stem which, when depressed, moves said valve stem from its normal position towards said container opening thereby permitting the egress of contents of said container through said passage outlet; a substantially vertical upstanding wall extending above said flexible top and said skirt for preventing accidental depression of said flexible top and said valve stem; said flexible top being capable of being depressed independently of said upstanding wall and said skirt but only by selective pressure applied within the boundary of the upstanding wall.*

*7. An aerosol dispenser assembly having a container, valve assembly and cap, which comprises: a dispenser container having an upper opening for receiving a dispensing valve assembly; a dispensing valve assembly comprising a valve housing having an opening; said housing having means for being attached to said container at said container opening; substantially vertically extending fluid passage means with an upper outlet positioned above said container and a lower inlet communicating with the confines of said container; a vertically extending, vertically reciprocative valve stem having an upper portion extending above said container; and sealing means for selectively opening and sealably closing said fluid passage means; said sealing means, valve stem and passage means being operatively associated with each other so that said sealing means normally closes said passage means and thereby prevents the egress of contents of said container through said passage outlet, and movement of said stem from its normal position permits the egress of contents of said container through said passage outlet; and an integral flexible removable plastic cap comprising a cylindrical noncollapsible skirt portion normally detachably secured to said container and normally circumscribing said passage means and said upper portion of the reciprocative valve stem; the lower end of said skirt having retaining means for permitting the cap to be secured to said valve housing; said skirt portion having a fluid outlet extending at an angle to the axis of said stem through which the container contents is adapted to spout; said cap having a substantially flat flexible top spaced above said skirt and overlying said upper portion of the valve stem which, when depressed, moves said valve stem from its normal position towards said container opening thereby permitting the egress of contents of said container through said passage outlet; a substantially vertical upstanding wall extending above said flexible top and said skirt for preventing accidental depression of said*

*flexible top and said valve stem; said flexible top being capable of being depressed independently of said upstanding wall and said skirt but only by selective pressure applied within the boundary of the upstanding wall.*

References Cited in the file of this patent or the original patent

UNITED STATES PATENTS

| | | |
|---|---|---|
| 356,432 | Thayer | Jan. 18, 1887 |
| 2,487,434 | Geis et al. | Nov. 8, 1949 |
| 2,514,030 | Coyle | July 4, 1950 |
| 2,543,850 | Henricson | Mar. 6, 1951 |
| 2,565,050 | Smith | Aug. 21, 1951 |
| 2,565,954 | Dey | Aug. 28, 1951 |
| 2,573,624 | Svendsen | Oct. 30, 1951 |
| 2,579,977 | Sjolin | Dec. 25, 1951 |
| 2,615,597 | Tomasek et al. | Oct. 28, 1952 |
| 2,624,623 | Saacke | Jan. 6, 1953 |
| 2,697,635 | Ivins et al. | Dec. 21, 1954 |